(12) United States Patent
Mahadev et al.

(10) Patent No.: US 6,916,227 B2
(45) Date of Patent: Jul. 12, 2005

(54) METHOD AND APPARATUS FOR PROCESSING SLIDERS FOR USE IN DISK DRIVES AND THE LIKE

(75) Inventors: Niraj Mahadev, Fremont, CA (US); Manuel A. Hernandez, San Jose, CA (US)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 10/287,910

(22) Filed: Nov. 4, 2002

(65) Prior Publication Data

US 2004/0087253 A1 May 6, 2004

(51) Int. Cl.[7] .............................................. B24B 1/00
(52) U.S. Cl. ................... 451/41; 41/5; 41/28; 29/603.8
(58) Field of Search .......................... 451/41, 28, 5–16, 451/54; 29/603.08, 603.12, 603.16, 603.17, 603.1, 603.09

(56) References Cited

U.S. PATENT DOCUMENTS

| | | | | |
|---|---|---|---|---|
| 5,335,458 | A | | 8/1994 | Stoffers et al. ................ 51/317 |
| 5,468,177 | A | | 11/1995 | Kindler et al. ............... 451/364 |
| 5,603,156 | A | * | 2/1997 | Biskeborn et al. ........ 29/603.16 |
| 5,632,669 | A | * | 5/1997 | Azarian et al. ................ 451/54 |
| 5,735,036 | A | | 4/1998 | Barr et al. ................ 29/603.12 |
| 5,749,769 | A | * | 5/1998 | Church et al. .................. 451/5 |
| 5,885,131 | A | * | 3/1999 | Azarian et al. ................. 451/5 |
| 5,982,583 | A | | 11/1999 | Strom ........................ 360/103 |
| 6,040,034 | A | | 3/2000 | Okada et al. ................ 428/143 |
| 6,040,959 | A | | 3/2000 | Kobayashi et al. .......... 360/103 |
| 6,255,621 | B1 | | 7/2001 | Lundquist et al. ..... 219/121.72 |
| 6,398,623 | B1 | | 6/2002 | Fukuroi et al. ................ 451/36 |
| 6,531,084 | B1 | | 3/2003 | Strom et al. ................. 264/400 |
| 2001/0030835 | A1 | | 10/2001 | Hipwell et al. ............. 360/237 |
| 2001/0043559 | A1 | | 11/2001 | Schaenzer et al. .......... 369/300 |
| 2002/0039256 | A1 | | 4/2002 | Polycarpou et al. ...... 360/236.7 |
| 2004/0087253 | A1 | | 5/2004 | Mahadev et al. ............. 451/41 |

FOREIGN PATENT DOCUMENTS

| | | | |
|---|---|---|---|
| CN | 1254922 A | 5/2000 | ........... G11B/21/21 |
| JP | 2301014 A2 | 12/1990 | ............ G11B/5/60 |
| JP | 5282641 A2 | 10/1993 | ............ G11B/5/60 |
| JP | 8203050 A2 | 8/1996 | ............ G11B/5/60 |
| JP | 9091648 A2 | 4/1997 | ............ G11B/5/60 |
| JP | 9290359 A2 | 11/1997 | ........... B24B/21/00 |

OTHER PUBLICATIONS

U.S. Appl. No. 10/691,389; Filed: Oct. 22, 2003, Title: "System and Method For Edge Blending Hard Drive Head Sliders", Applicant/Inventor: Zhu Jian Zhan et al.

* cited by examiner

*Primary Examiner*—Lee D. Wilson
(74) *Attorney, Agent, or Firm*—Kenyon & Kenyon

(57) ABSTRACT

A system and method are described for processing a slider (e.g., one to be used in a disk drive apparatus). Corners of the sliders are abraded while still a part of a row of sliders in a part-off operation. By abrading the corners of the sliders, head slap events between the slider and the recording media result in less damage to the recording media and less particulate matter from the slider being left on the recording media, improving data integrity for the recording media.

15 Claims, 5 Drawing Sheets

METHOD AND APPARATUS FOR PROCESSING SLIDERS FOR USE IN DISK DRIVES AND THE LIKE

FIELD OF THE INVENTION

The present invention pertains to a method and apparatus for processing slider devices for hard disk drives and the like. More particularly, the present invention pertains to smoothing corners of sliders so as to avoid damage to moving recordable media in head-media contact events.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desirable benefits which may be more readily achieved through particular ABS designs. Fluctuations in flying height are known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or flying sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

What often causes changes to the flying height is the continual high speed movement of the slider across the rotating disk while performing read or write operations. For example, depending on the radial position of the slider, the respective linear velocity of the disk varies. Higher velocities are observed at the outer edge of the rotating disk, while lower velocities are found at the inner edge. As a result, the air bearing slider flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider to fly lower. Accordingly, slider designs must account for the noticeable effect that variations in radial position, and relative velocity, have on the flying height.

The flying height of a slider is also adversely affected by changes in skew. The skew angle is defined and measured as the angle formed between the longitudinal axis of the slider body and the direction of the air flow tangential to the disk rotation. When the mounted slider is positioned near the inner or outer edges of the spinning disk, its longitudinal axis is often skewed in relation to the direction of the air flow. The longitudinal axis of the slider may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 75.

As the flying height of the slider decreases, interference between the slider ABS and the disk surface increases in frequency. This is especially true in portable electronics that include disk drives, such as laptop computers. When a disk drive is dropped, the slider can impact the recording media. In many situations, the slider lifts up from the recording media and then impacts the media due to the spring-like force from the suspension that urges the slider towards the recording media. Each impact of the slider on the recording media is commonly referred to as "head slap." In a single shock event (e.g., dropping the disk drive), several head slaps can occur.

There are several problems associated with head slaps. First, the slider, itself, can cause damage to the recording media because of the impact. Often, data recorded in the area of impact is irretrievably lost. Second, the corners of the slider body tend to be very sharp, and are the first to contact the recording media. The corners dig into the recording media causing depressions and protrusions in the media. As the slider moves from one area of the media to another, these protrusions may become dislodged, and the material is dragged to other areas of the disk causing recorded data to be erased and permanently lost. Third, thermal asperities often occur. Due to the mismatch in the surface roughness coefficient between the ABS side of the slider and the diced or cut side, the resulting edges turn out to be potential sources for loosely attached AlTiC particles. These particles may also become dislodged and land on the recording media. When these particles come between the recording head and the media (e.g., the head disk interface), it may cause thermal distortions for the sensor. These distortions can be interpreted as false data signals, affecting the data integrity of the recording media.

In the art, the common methods for dealing with head slap often focus on trying to prevent the slider from impacting the recording media. These methods include improvements to spindle motors, disk clamp enhancements, and additions of shock absorbing features to the suspension. Also, hydrodynamic bearings could be used to address the problems associated with head slap. Though effective in reducing the frequency of head slaps, these methods cannot completely eliminate head slaps without sacrificing recording media capacity (e.g., through an exceptionally high flying height). Accordingly, there is a need in the art to reduce the negative effects caused by head slaps in these devices.

SUMMARY OF THE INVENTION

According to an embodiment of the present invention, the slider body is processed using, for example, an abrasive tape to smooth the edges of the slider body. During head slap events, the lack of sharp edges decreases the likelihood of causing protrusions in the recording media surface and decreases the likelihood of slider particles dislodging from the slider body. The net result is less debris on the recording media surface reducing the loss of data and improving the integrity of the data signals written to and read from the recording media.

DETAILED DESCRIPTION

Figure 1:
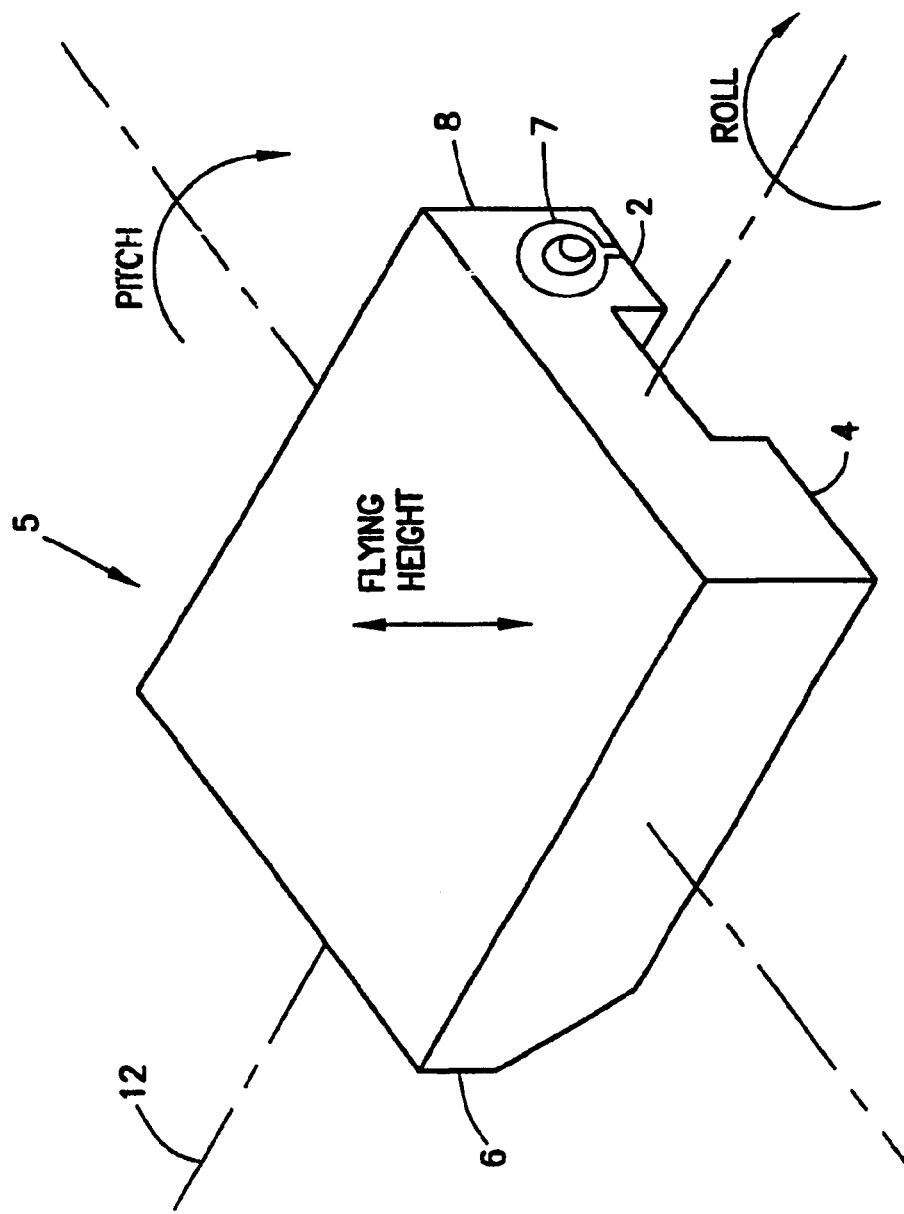
FIG. 1 is a perspective view of a slider device with a read/write head that is known in the art.
Figure 2:
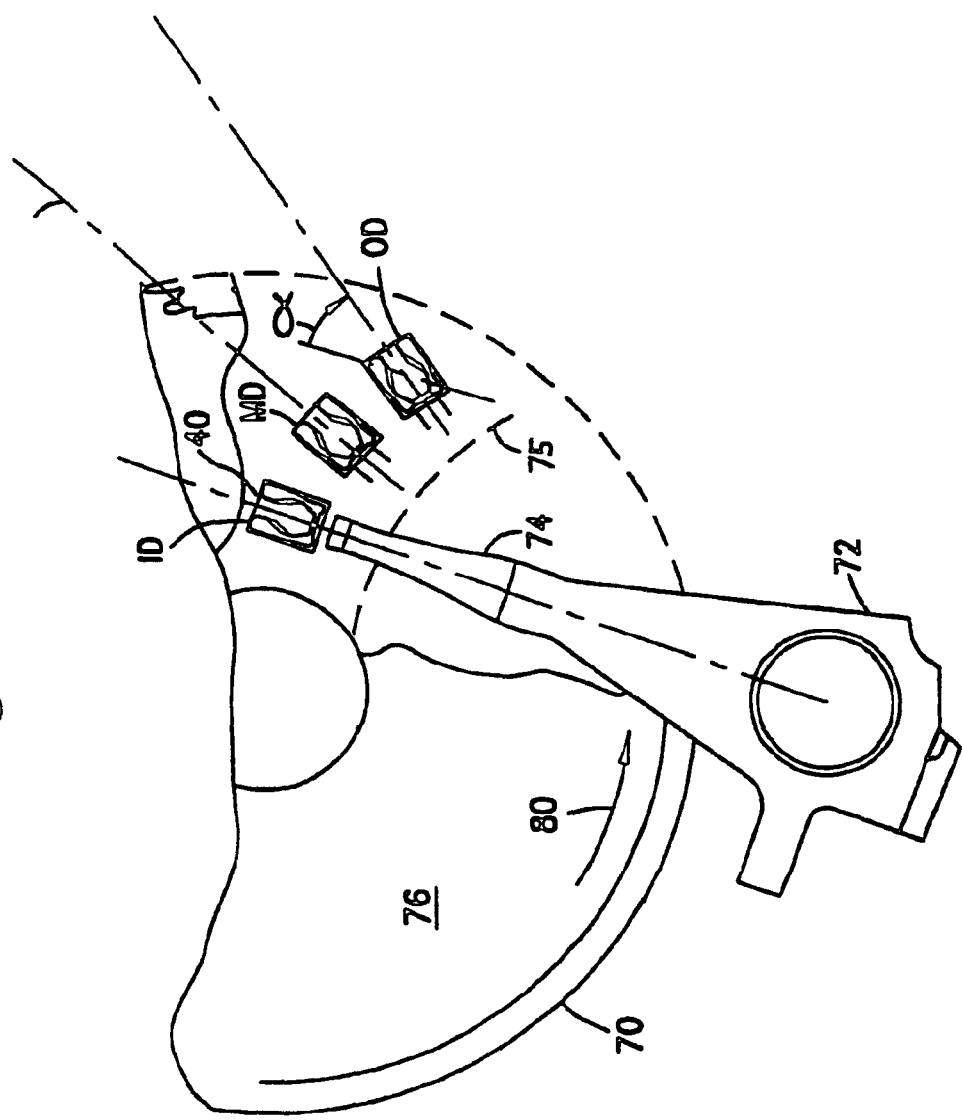
FIG. 2 is a perspective view of a disk drive device that is known in the art.
Figure 3:
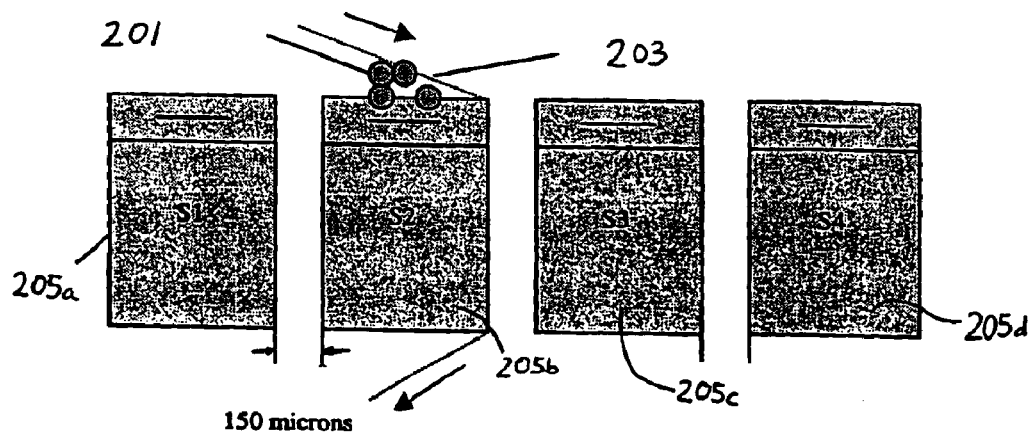
FIG. 3 is a perspective view of one method for smoothing corners of a slider according to an embodiment of the present invention.

Referring to FIG. 3, a partial view of a row of sliders is shown for implementing a method according to an embodiment of the present invention. In this embodiment, an abrasive tape 203 is used where one side includes an abrasive component and the other side is relatively smooth. For example, the abrasive tape can be a single, high-precision diamond tape manufactured by 3M Co. having a width of 2.5 mm and a thickness of 25 $\mu$m, though the physical dimensions of the tape can be chosen based on the design of the head-parting tool. In this embodiment, the tape 203 moves along a path that rubs adjacent corners of a single slider 205b. Thus, in this embodiment, the abrasive side of tape 203 is facing the slider 205b. A lubricant 201 may be used to facilitate the movement of the tape over the slider body.

Figure 4:
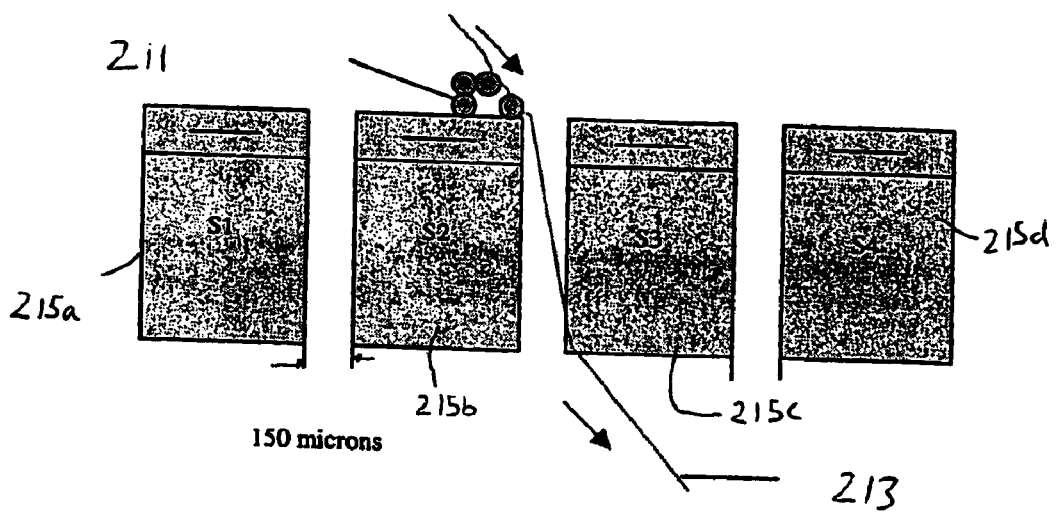
FIG. 4 is a perspective view of another method for smoothing corners of a slider according to an embodiment of the present invention.
Figure 5:
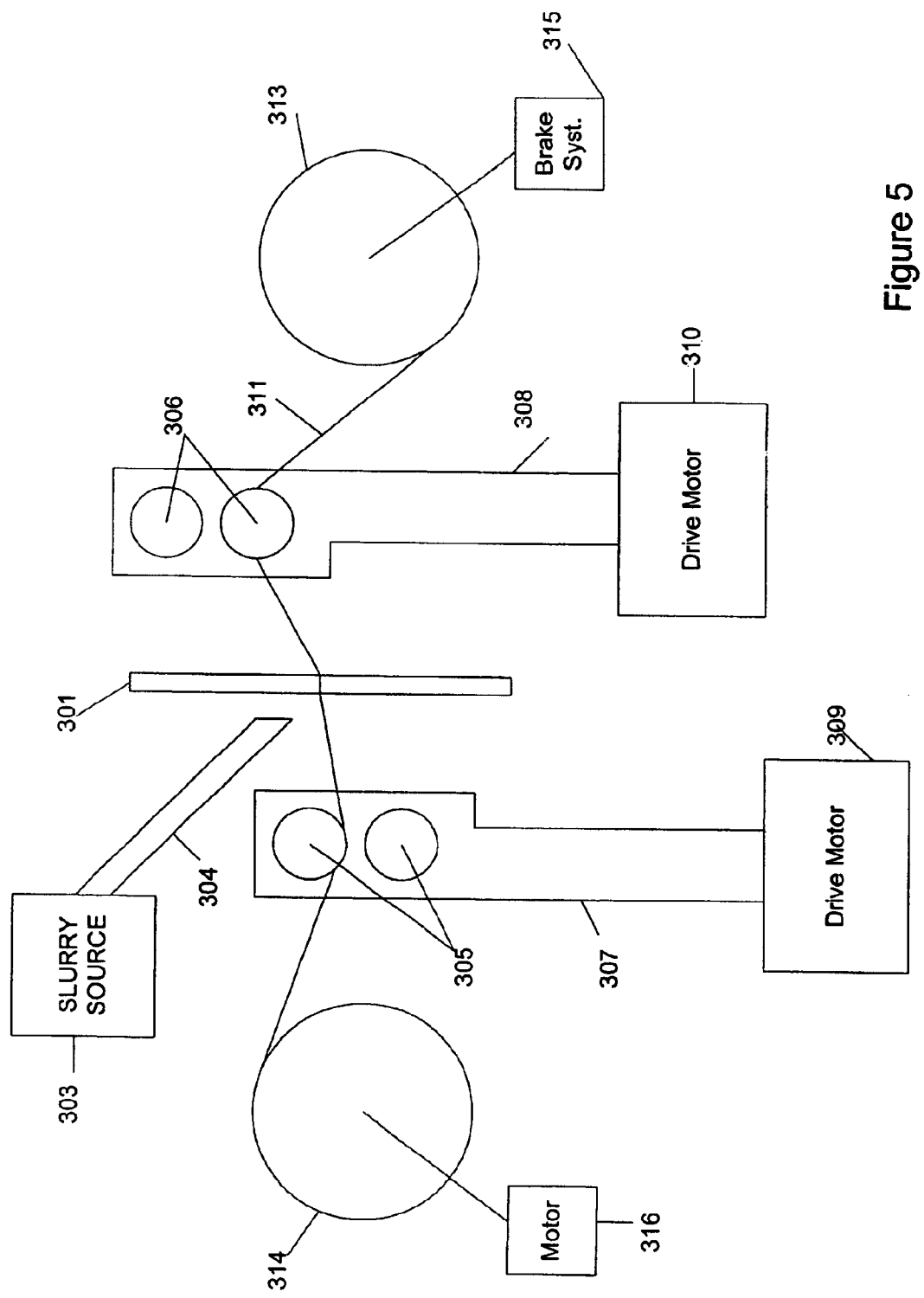
FIG. 5 is a block diagram of a system constructed according to an embodiment of the present invention.

Referring to FIG. 4, a partial view of a row of sliders is shown in another embodiment of the present invention. In this embodiment, the abrasive tape 213 has an abrasive component on both sides of the tape. For example, two abrasive tapes facing back to back can serve as abrasive tape 213 in FIG. 5. As seen in FIG. 5, the tape 213 moves along a path that rubs a first corner of a first slider 215b and a first corner of a second slider 215c. Again, a lubricant 211 may be used to facilitate the movement of the tape over the slider bodies.

In the embodiments of FIGS. 3 and 4, the lubricant 201, 211 may be an abrasive slurry, for example, by including diamond particles having an average diameter of less than 3 µm in a lubricious oil. The use of an oil reduces the risk of charge build up by avoiding dry lapping of the slider. Also, by adding slurry into the oil, the coefficient of friction between the tape and the slider is reduced, the risk of tearing of the tape is reduced as well.

Referring to FIG. 5, a system for implementing an embodiment of the present invention is shown. In FIG. 5, the tape 311 (e.g., an abrasive tape) is supplied by a first spool 313 to a take-up or second spool 314. In this embodiment, the first spool is coupled to a brake system 315, which provides resistance to pulling of the tape from the spool. The take-up spool 214 is coupled to a motor 316, which works to pull the tape from the first spool 313. Two arms 307 and 308 are provided, which are able to moved up and down as well as sideways by drive motors 309, 310, respectively. Arm 307 includes frictionless bearings 305 and arm 308 includes frictionless bearings 306. In this embodiment, the tape 311 runs from spool 313 through bearings 306 of the first arm 308 to bearing 305 on the second arm 307 to take spool 314. These components may be coupled to a central plate (not shown) so that they can be moved together in unison.

In one embodiment, the row of sliders 301 is placed mid-way between the arms 307, 308, so that the tape is disposed between two adjacent sliders in the row. The arms 307, 308 control the angle of entry for the tape relative to the corners of the sliders. In this embodiment, the arms maintain the angle of entry and exit of the tape. Drive motors 309,310 may be used to control these angles. Additional rollers placed at desired distances from the tape entry and exit points may improve the symmetry of the abrading process. One skilled in the art will appreciate based on the above teachings that it may be desirable to maintain uniformity in the angles and the amount of abrading that is done to the slider corners. Accordingly, a timer may be provided to provide uniform abrasion. Though the angles of the tape relative to the sliders can be measured visually, it may be desirable to use high-precision linear motors/actuators to control arms 307 and 308.

The system of FIG. 5 is able to achieve the processing of slider corners as shown in FIGS. 3 and 4. As set forth in the description of FIGS. 3 and 4, the tape 311 can have one or both sides include an abrasive component. Also a lubricant can be introduced into the system (e.g., where the tape enters the gap between sliders. In one embodiment, the lubricant can be a slurry including diamond particles having an average diameter of less than 3 µm in a lubricious oil. The lubricant slurry can be supplied by a slurry source 303 and deposited at the incoming portion of the tape 311 by a flow tube 304.

Figure 6:
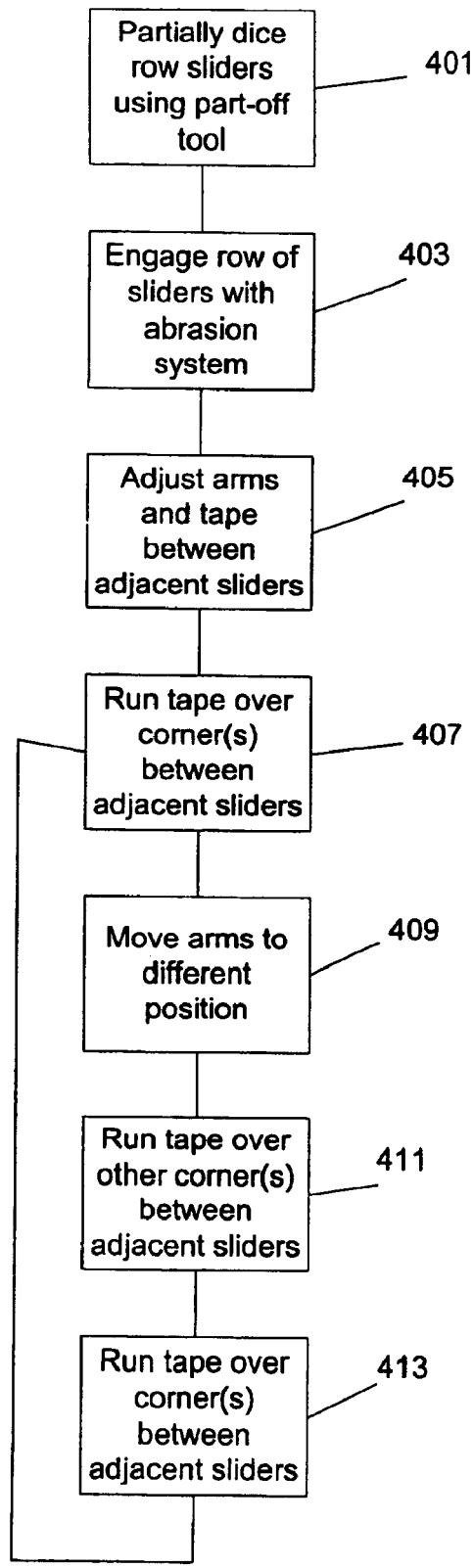
FIG. 6 is a flow diagram of a method for processing sliders according to an embodiment of the present invention.

Referring to FIG. 6, a flow diagram of a method for processing a row of sliders according to an embodiment of the present invention is shown. In block 401, the row of sliders is fully diced using a part-off tool as known in the art. In this embodiment, the width of the cut is 150 µm and the depth of the cut is 2 mm. In block 403, the row of sliders is engaged with the system of FIG. 5. For example, the part-off tool can be disposed underneath the plate upon which the system of FIG. 5 resides. After the partial dicing operation, the plate bearing the system of FIG. 5 can then be lowered onto the row of sliders so that the tape is placed between a desired pair of adjacent sliders. For example, a screw gauge can be used to fine tune the positioning of this system over the row of sliders. In such a configuration, a microscope can be placed above the system of FIG. 5 for observation of the abrading process.

In block 405, the arms are adjusted so that the angles of entry and exit of the tape between adjacent sliders are set to desired values. In block 407, the tape is run between a pair of sliders either in the configuration of FIG. 3 (e.g., a "C" blend approach) and/or FIG. 4 (e.g., a "S" blend approach). In this embodiment, the width of the tape is 2.5 mm, 25% more than the depth of the cut between adjacent sliders. Accordingly, the tape curves around the corner and bends slightly downwards removing material from the edge formed between the ABS and the diced faces of the slider.

In block 409, the arms are moved to a new position. In the case of the S blend approach in FIG. 4, the arm positions would be reversed (i.e., arm 307 would be moved so that it would be directly across from where arm 308 is and arm 308 would be moved in the opposite direction). For the C blend approach, both arms 307 and 308 would be moved forward or back (up and down in FIG. 5) so as to be the same distance from the corners being abraded. In block 411, the next corners between the adjacent sliders are abraded. In block 411, the tape is lifted out of the space between the sliders (or the row of sliders is lowered away from the tape) and moved to the next space on the row. Assuming that the arms are in the appropriate position, blocks 407 to 411 are repeated until all corners have been abraded as desired.

Using the method and apparatus described above provides for smoother corners for the slider. In impact events such as head slap, the slider make less damage to the recording media resulting in less debris from the media. Also, the process described above results in less debris in the finished slider, and less debris from the slider in head slap events. The result is greater data integrity and less damage to the recording media.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

For example, though in FIGS. 3 and 4, two corners of each slider are abraded with the tape, it may be desirable to only abrade the corners at the trailing edge of the slider, at the leading edge of the slider, etc. In these situations, the arms 307 and 308 can be adjusted so that only one corner is abraded at a time.

What is claimed is:

1. A method of processing a slider comprising:
providing a row of sliders; and
providing a tape supplied by a first spool, said tape to run along at least one corner of a first slider and between said first slider and a second slider in said row of sliders, said tape to abrade said at least one corner.

2. The method of claim 1 further comprising:
providing a second spool to take up said tape.

3. A method of processing a slider comprising:
providing a row of sliders:
providing a tape supplied by a first spool, said tare to run alone at least one corner of a first slider in said row of sliders, said tape to abrade said at least one corner;
providing a second spool to take un said tape; and
providing first and second arms, each including at least one bearing, on each side of said row of sliders to guide said tape between adjacent sliders of said row.

4. The method of claim 3 wherein said tape includes an abrasive component on at least one side of said tape.

5. The method of claim 3 further comprising:
providing a lubricious oil between said tape and the at least one corner of said slider.

6. The method of claim 5 wherein said lubricious oil is part of slurry including abrasive particles.

7. The method of claim 6 wherein said abrasive particles are diamond particles.

8. A system for processing a slider comprising:
a tape including an abrasive component on at least one side of said tape; and
a slider, wherein said tape is to move along and abrade at least a first corner of said slider, said first corner between an air bearing surface of said slider and a surface opposite said air bearing surface of said slider.

9. The system of claim 8 further comprising:
a first spool to supply said tape.

10. The system of claim 9 further comprising:
a second spool to take-up tape supplied by said first spool.

11. A system for processing a slider comprising:
a tape including an abrasive component on at least one side of said tape;
a slider, wherein said tape is to move alone and abrade at least a first corner of said slider a second spool to take-up tare supplied by said first spool; and
first and second arms, each including a bearing, provided at opposite sides of said slider to guide said tape to abrade the corner of said slider.

12. The system of claim 11 wherein each of said first and second arms includes two bearings.

13. The system of claim 12 further comprising:
first and second drive motors to position said first and second arms.

14. The system of claim 13 further comprising:
a slurry source to supply an abrasive solution between said tape and said slider.

15. The system of claim 13 wherein said slider is part of a row of sliders.

* * * * *

UNITED STATES PATENT AND TRADEMARK OFFICE
CERTIFICATE OF CORRECTION

PATENT NO. : 6,916,227 B2
DATED : July 12, 2005
INVENTOR(S) : Niraj Mahadev et al.

It is certified that error appears in the above-identified patent and that said Letters Patent is hereby corrected as shown below:

Column 7,
Line 13, "tare" should be -- tape --;
Line 16, "un" should be -- up --.

Column 8,
Line 15, "tare" should be -- tape --.

Signed and Sealed this

Seventh Day of March, 2006

JON W. DUDAS
*Director of the United States Patent and Trademark Office*